(12) United States Patent
Choi et al.

(10) Patent No.: US 7,337,254 B2
(45) Date of Patent: Feb. 26, 2008

(54) INFORMATION PROCESSING SYSTEM AND METHOD OF CONTROLLING THE SAME

(75) Inventors: Seung-beom Choi, Seongnam-si (KR); Kwangyun Na, Suwon-si (KR); Yong-hoon Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 199 days.

(21) Appl. No.: 11/127,217

(22) Filed: May 12, 2005

(65) Prior Publication Data
US 2005/0257040 A1    Nov. 17, 2005

(30) Foreign Application Priority Data
May 12, 2004    (KR) .................... 10-2004-0033623

(51) Int. Cl.
G06F 13/24    (2006.01)
G06F 13/12    (2006.01)
G06F 13/30    (2006.01)

(52) U.S. Cl. .................. 710/266; 710/260; 710/62; 710/65

(58) Field of Classification Search .......... 710/65, 710/67, 69, 260, 266, 269; 713/300, 310, 713/320, 1, 2, 323–324; 714/36
See application file for complete search history.

(56) References Cited

U.S. PATENT DOCUMENTS

| | | | | |
|---|---|---|---|---|
| 5,590,312 A | * | 12/1996 | Marisetty ................... | 703/23 |
| 5,905,914 A | * | 5/1999 | Sakai et al. .................. | 710/67 |
| 5,910,930 A | * | 6/1999 | Dieffenderfer et al. ..... | 368/156 |
| 6,125,236 A | * | 9/2000 | Nagaraj et al. ............. | 710/260 |
| 6,145,048 A | * | 11/2000 | Klein ......................... | 710/264 |
| 6,317,798 B1 | * | 11/2001 | Graf ........................... | 710/15 |
| 2005/0188278 A1 | * | 8/2005 | Zimmer et al. .............. | 714/42 |

FOREIGN PATENT DOCUMENTS

CN    1301127    6/2001
(Continued)

OTHER PUBLICATIONS

'power-on self-test'. "The Free On-Line Dictionary of Computing". Online Mar. 30, 2001. Retrieved from Internet Jun. 1, 2007. <http://foldoc.org/index.cgi?POST>.*
(Continued)

*Primary Examiner*—Mark H. Rinehart
*Assistant Examiner*—Thomas J Cleary
(74) *Attorney, Agent, or Firm*—Staas & Halsey LLP (57) ABSTRACT

An information processing system operating in response to a remote control signal transmitted from a remote controller, the information processing system including a remote signal receiver to receive the remote control signal; an interrupt generator to generate a system management interrupt signal when receives the remote control signal by the remote signal receiver; and a controller to process the remote control signal received by the remote signal receiver and to control the information processing system to operate in correspondence to the remote control signal when the interrupt generator generates the system management interrupt signal.

6 Claims, 5 Drawing Sheets

FOREIGN PATENT DOCUMENTS

| | | |
|---|---|---|
| KR | 90-16099 | 9/1990 |
| KR | 10-316736 | 10/1996 |
| KR | 10-174958 | 6/1997 |
| KR | 97-58212 | 7/1997 |
| KR | 10-280783 | 5/1998 |
| KR | 2001-67468 | 7/2001 |
| KR | 2004-01651 | 1/2004 |

OTHER PUBLICATIONS

Korean Intellectual Property Office Notice of Offical Action issued Dec. 12, 2005 in Application No. 10-2004-0033623.

The First Office issued on Feb. 16, 2007 by The State Intellectual Property Office of P.R. China in the corresponding Chinese Application No. 2005100699290 (5 pages) (7 pages of English translation).

* cited by examiner (PRIOR ART)
FIG. 1

INFORMATION PROCESSING SYSTEM AND METHOD OF CONTROLLING THE SAME

CROSS-REFERENCE TO RELATED APPLICATION

This application claims the benefit of Korean Patent Application No. 2004-33623, filed May 12, 2004, in the Korean Intellectual Property Office, the disclosure of which is incorporated herein by reference.

BACKGROUND OF THE INVENTION

1. Field of the Invention

The present invention relates to an information processing system and a method of controlling the same, and more particularly, to an information processing system and a method of controlling the same, in which a remote control signal is processed without a separate microcomputer for receiving the remote control signal to execute a corresponding operation, thereby reducing a production cost and simplifying a circuit design.

2. Description of the Related Art

Generally, an information processing system such as a computer system, an embedded system, an A/V system, or the like, includes various switches or buttons to allow a user to control and handle the systems.

On the other hand, to enhance a user's convenience, a remote controller is frequently used to control the information processing system.

Figure 1:
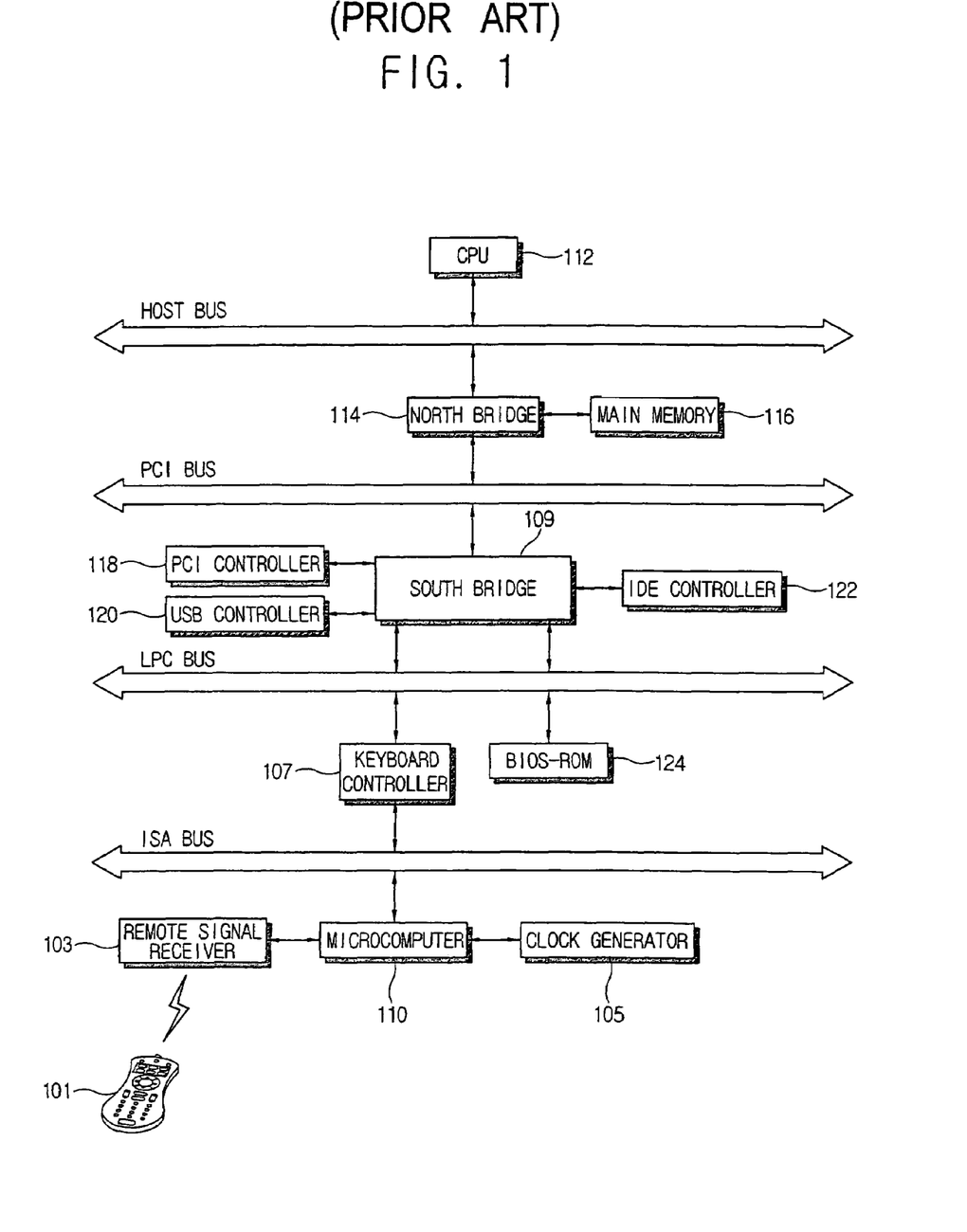
FIG. 1 is a control block diagram of a conventional information processing system.

FIG. 1 is a control block diagram of a conventional information processing system that can be remotely controlled by the remote controller. As shown therein, a conventional information processing system includes a remote signal receiver 103 to receive a remote control signal transmitted when a button of a remote controller 101 is pushed; a clock generator 105 to generate a clock signal; a microcomputer 110 synchronously operated by the clock signal of the clock generator 105 so as to analyze and convert the remote control signal received by the remote signal receiver 103 into a corresponding code, and transmitting the converted code to a south bridge 109 through a keyboard controller 107 (or a USB controller 120); the south bridge 109 to receive the converted code from the microcomputer 110 so as to generate an interrupt signal to a central processing unit 112 and the central processing unit 112 loading a handler from a keyboard device driver (or a USB device driver) when receiving the interrupt signal from the south bridge 109, and transmitting the code converted by the microcomputer 110 to application programs or the like.

The control block diagram of a conventional information processing system shown in FIG. 1 includes a north bridge 114, a main memory 116, a PCI (peripheral component interconnect) controller 118, an IDE (integrated drive electronics) controller, and a reference numeral 124 refers to a BIOS (basic input/output system)-ROM (read only memory) 122.

With this configuration, a remote control of the conventional information processing system occurs in the following manner. The microcomputer 110 analyzes the remote control signal received by the remote signal receiver 103 and converts the remote control signal into data, thereby transmitting the converted data to the south bridge 109 through the keyboard controller 107 (or the USB controller 120). Then, the south bridge 109 generates the interrupt signal to the central processing unit 112. The central processing unit 112 receives the interrupt signal and loads the handler from the keyboard device driver (or the USB device driver), thereby transmitting the converted data to a device driver, an application program or the like to implement a corresponding operation.

However, in the conventional information processing system, A microcomputer 110 is separately required to analyze, convert and transmit the remote control signal. For this reason, a production cost is increased, a separate control program is required according to the type of the microcomputer 110, and a clock generator 105 is required to drive the microcomputer 110.

Further, when system information is needed such as a power management state, etc., the microcomputer 110 receives the system information through a separate interface. Also, when the control program for the microcomputer 110 is updated, hardware logic is additionally required in order to update the control program.

Further, when the microcomputer 110 uses a USB interface, a USB device driver corresponding to an OS (operating system) is separately required.

SUMMARY OF THE INVENTION

An aspect of the invention provides an information processing system and a method of controlling the same, in which a remote control signal is processed without a separate microcomputer for receiving the remote control signal to implement a corresponding operation, thereby reducing a production cost and simplifying a circuit design.

The foregoing and/or other aspects of the invention are also achieved by providing an information processing system operating in response to a remote control signal transmitted from a remote controller, the information processing system including a remote signal receiver to receive the remote control signal; an interrupt generator to generate a system management interrupt (SMI) signal when recording the remote control signal by the remote signal receiver; and a controller to process the remote control signal received by the remote signal receiver and to control the information processing system to operate in correspondence to the remote control signal when the interrupt generator generates the SMI signal.

According to an aspect of the invention, the information processing system further includes a wakeup unit to transmit a wakeup signal to the interrupt generator and to wake the information processing system up in response to the remote control signal received by the remote signal receiver when the information processing system is in a power-off mode or a power manage mode.

According to an aspect of the invention, the controller includes an SMI handler of a BIOS to process and convert the remote control signal into corresponding data when the SMI signal is generated.

According to an aspect of the invention, the information processing system further includes a system management memory (SMM) accessible when the SMI signal is generated, wherein the SMI handler is loaded into the SMM when the information processing system is turned on.

According to an aspect of the invention, the interrupt generator has a general purpose input port to receive the remote control signal and transmits the system management interrupt signal to a processor which then turns over control authority of the information processing system to the system management interrupt handler stored in the system management memory.

According to an aspect of the invention, the system management interrupt handler analyzes a waveform of the remote control signal to implement a corresponding operation of the information processing system.

According to an aspect of the invention, the controller transmits the converted data to a predetermined place through a keyboard controller.

According to an aspect of the invention, the place includes at least one of a device driver, a launcher program, and an application program According to another aspect of the invention, a method of controlling an information processing system operating in response to a remote control signal transmitted from a remote controller, the method including inputting the remote control signal from the remote controller to an interrupt generator; allowing the interrupt generator to generate a system management interrupt (SMI) signal when the remote control signal is inputted; and processing the inputted remote control signal and controlling the information processing system to operate in correspondence to the remote control signal when the interrupt generator generates the SMI signal.

According to an aspect of the invention, the method further includes transmitting a wakeup signal to the interrupt generator to wake the information processing system up in response to the remote control signal when the information processing system is in a power-off mode or a power manage mode.

According to an aspect of the invention, the remote signal receiver includes a radio frequency receiver to receive a radio frequency signal as the remote control signal and/or an infrared sensor to receive an infrared signal as the remote control signal.

According to an aspect of the invention, the information processing system is a computer system.

According to another aspect of the invention, a method of controlling an information processing system, the method including processing a control signal via a system management interrupt handler while the information processing system is operating, converting the control signal into data, and transmitting the converted data to appropriate locations; and temporarily storing the system management interrupt handler in memory when the information processing system is booted, the memory is only accessible to a system management interrupt mode at which a system management interrupt signal is generated, and when the control signal is received by the system after the system is booted, the system management interrupt signal is generated and independently controlled by the system management interrupt handler temporarily stored in the memory.

According to an aspect of the invention, the method further includes generating the system management interrupt signal according to the control signal; transmitting the generated system management interrupt signal to a processor; and turning over control authority of the information processing system to the system management interrupt handler stored in the memory.

According to an aspect of the invention, the booting is a power on self test-booting performed to determine a connection state of at least one peripheral unit, such that during the power on self test-booting, the memory is initialized to be accessible to the system management interrupt mode for processing the system management interrupt signal.

According to an aspect of the invention, the method further includes analyzing a waveform of the control signal to determine whether a custom code for the control signal is available such that a corresponding operation of the information processing system is implemented.

According to an aspect of the invention the analyzing the waveform of the control signal includes determining whether the waveform has a leader pulse; converting the control signal to binary data according to a pulse width of the leader pulse; accumulating custom code and data code for each data frame until all bits of data are accumulated in order to determine whether custom code is available for the control signal; and transmitting the completed frame data to at least one appropriate interface when it is determined that the custom code is available.

According to an aspect of the invention, the method further includes transmitting a wakeup signal to wake-up the information processing system upon receiving the control signal when the information processing system is in a power-off mode or a power manage mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the invention, examples of which are illustrated in the accompanying drawings, wherein like reference numerals refer to like elements throughout. The embodiments are described below to explain the present invention by referring to the figures.

Figure 2:
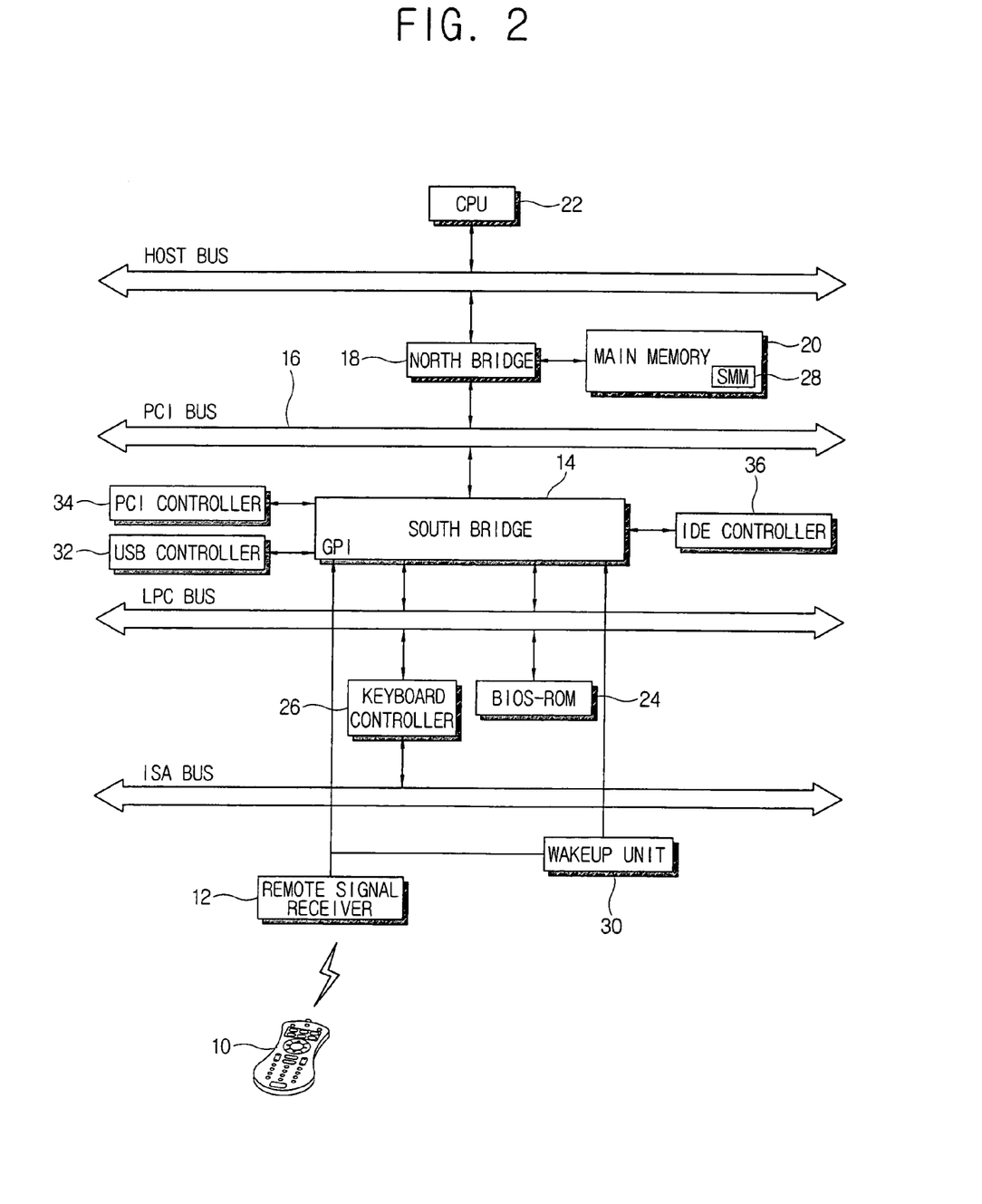
FIG. 2 is a control block diagram of an information processing system according to an embodiment of the invention.

FIG. 2 is a control block diagram of an information processing system according to an aspect of the invention. The information processing system includes all systems, such as a computer system, an embedded system, an A/V system, or the like, as long as they can be remotely controlled by a remote controller.

As shown in FIG. 2, the information processing system includes a remote signal receiver 12 to receive a transmitted when a button of a remote controller 10 is pushed; a south bridge 14 generating a system management interrupt (SMI) signal upon receiving the remote control signal by the remote signal receiver 12; a north bridge 18 connected to the south bridge 14 through a PCI bus 16 and managing data communication from among a central processing unit 22, a main memory 20, and a video card (not shown); a BIOS ROM including an SMI handler to process the remote control signal; a keyboard controller 26 used as an interface for transmitting data when the SMI handler of the BIOS ROM completely processes data; the main memory 20 in which the SMI handler, an OS, a device driver, an application program, etc. are resident; and a central processing unit (CPU) 22 totally controlling the system overall.

Further, according to an aspect of the invention, the information processing system includes a wakeup unit 30 generating a wakeup signal to the south bridge 14 to wake the system up from a power-off mode or a power management mode as necessary. Preferably, the south bridge 14 includes a power button event part (not shown), thereby waking the system up in response to the wakeup signal output from the wakeup unit 30.

Further, according to an aspect of the invention, the information processing system includes a USB controller 32 for a USB interface, a PCI controller 34 for a PCI interface, an IDE controller for an IDE device interface like the conventional information processing system. The system may include additional controllers to control additional interfaces.

The remote signal receiver 12 includes an infrared sensor, a radio frequency (RF) receiver, etc., to receive an infrared signal, an RF signal, etc.

The south bridge 14 is used as an aggregate register for managing input/output of peripheral units and includes a general purpose input (GPI) port to which the remote signal receiver 12 is directly connected. When the remote signal receiver 12 receives the remote control signal, the south bridge 14 receives the remote control signal through the GPI port and generates the SMI signal.

According to an aspect of the invention, the SMI signal has a highest priority as an interrupt signal for managing the system.

A BIOS stored in the BIOS-ROM 24 includes routines for driving input/output peripheral units, and the SMI handler for interrupt processing.

The SMI handler of the BIOS analyzes and processes the remote control signal received from the remote controller 10, thereby converting the remote control signal into corresponding data. Further, the SMI handler transmits the converted data to application programs or device drivers in order to implement a command corresponding to the pushed button of the remote controller 10.

The main memory 20 includes a system management memory (SMM) 28 having a predetermined capacity and being accessible to only an SMI mode at which the SMI signal is generated. When the system is turned on, the SMI handler in the BIOS-ROM 24 is loaded into the SMM 28 by the CPU 22. Accordingly, a program in the SMM 28 is executed independently of the running OS and has direct access to hardware components.

Figure 3:
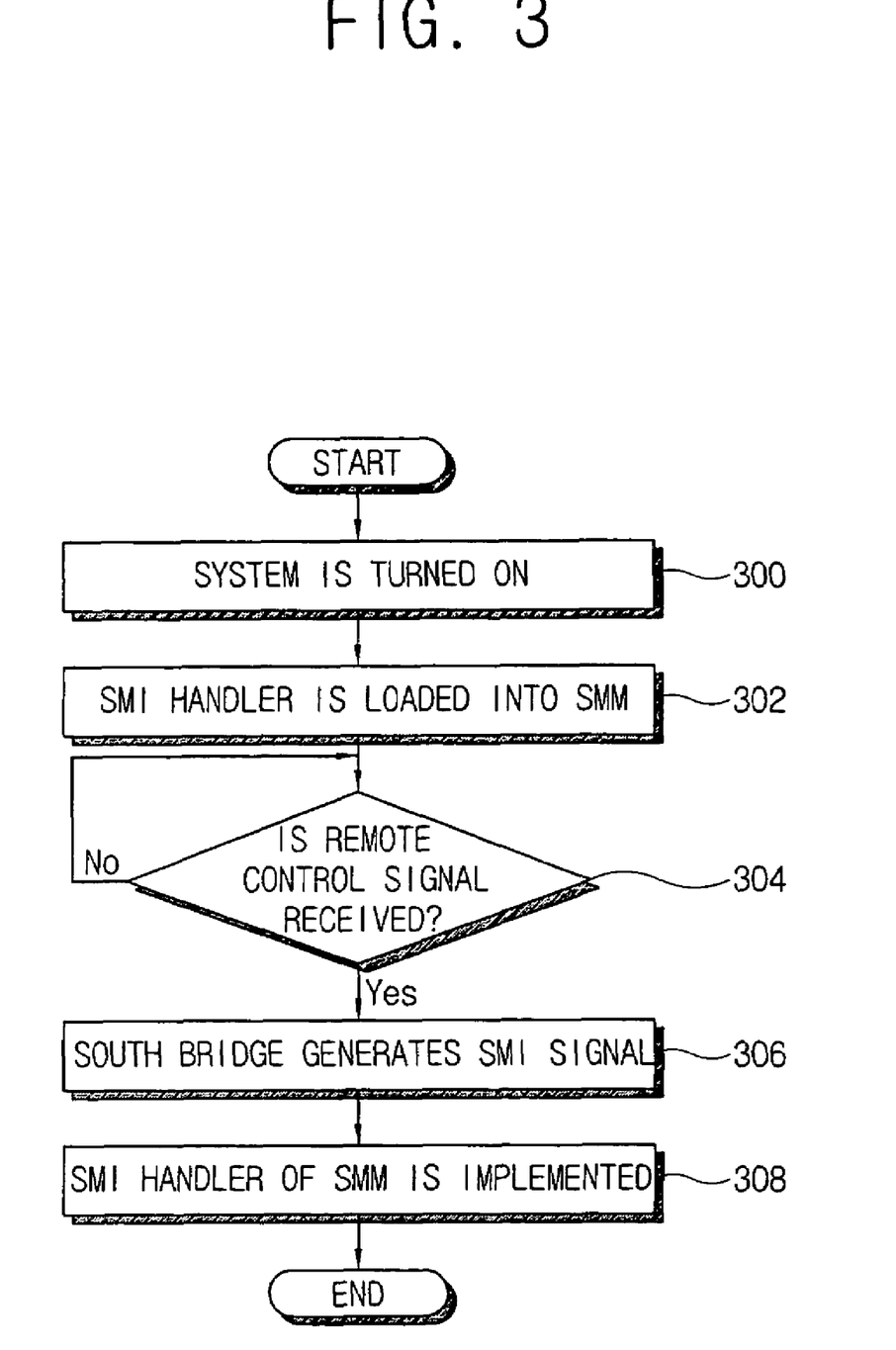
FIG. 3 is a control flowchart of the information processing system according to an embodiment of the invention.
Figure 4:
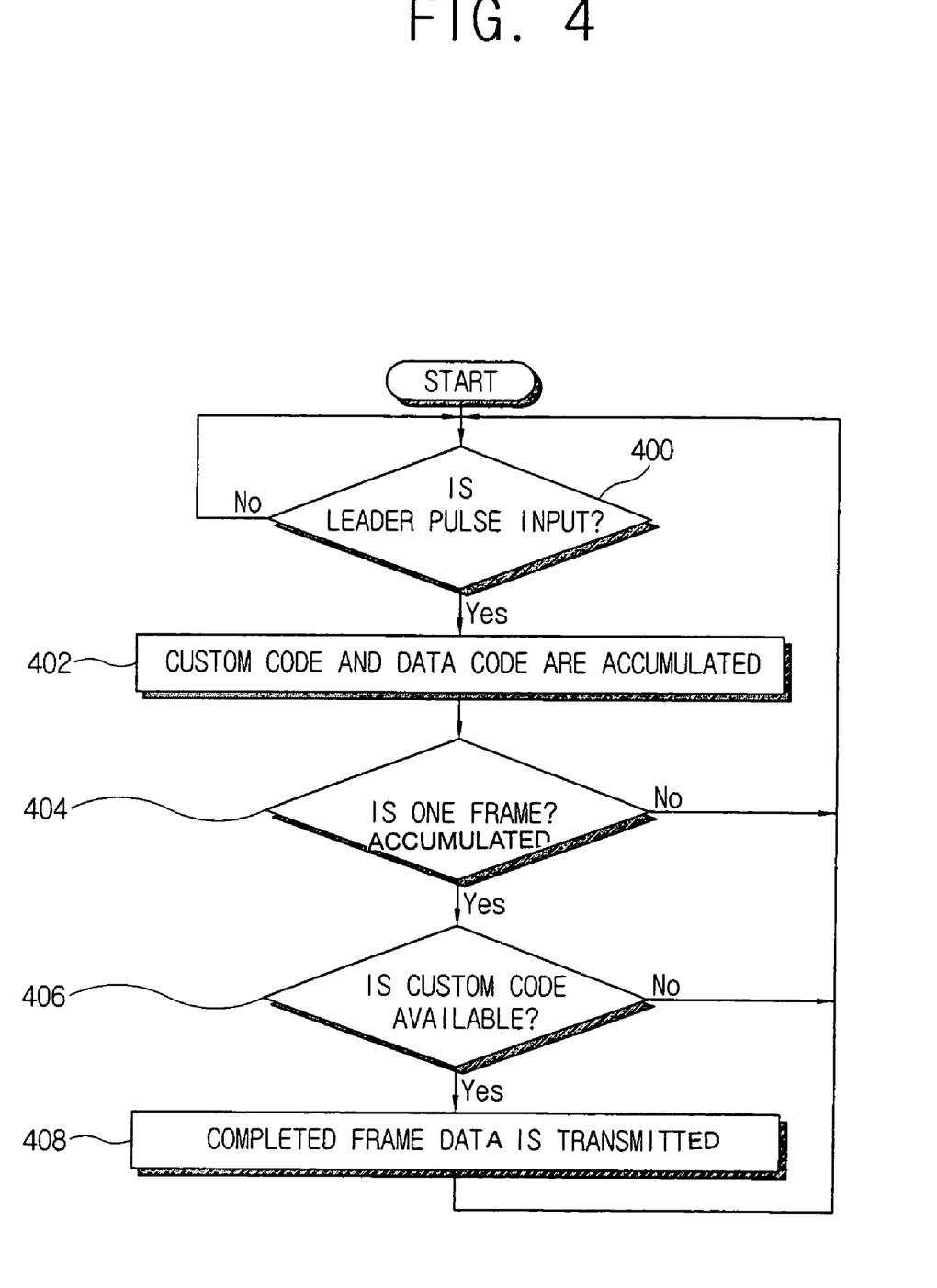
FIG. 4 is a flowchart of implementing an SMI handler of FIG. 3.

According to the configuration of the invention shown in FIG. 2, the control flowcharts of the information processing system according to an aspect of the invention is illustrated in FIGS. 3 and 4.

As shown in FIG. 3, at operation 300, the system is turned on, and the BIOS of the BIOS-ROM 24 implements POST (power on self test)-booting to check a connection state of at least one peripheral unit. During the POST booting, the SMM 28 provided in the main memory 20 is initialized to be accessible to the SMI mode for processing the SMI signal. At operation 302, the BIOS loads the SMI handler into the SMM 28. After completing the POST booting and Window booting, when a button of a remote controller 10 is pushed while the system is operating, the remote controller 10 outputs a remote signal (refer to FIG. 5). When the remote signal receiver 12 receives the remote signal at operation 304, the south bridge 14 generates the SMI signal at operation 306. The CPU 22 receives the SMI signal via the north bridge 18 and turns over control authority to the SMI handler of the SMM 28. When the control authority is turned over to the SMI handler, the SMI handler operates as follows at operation 308.

Figure 5:
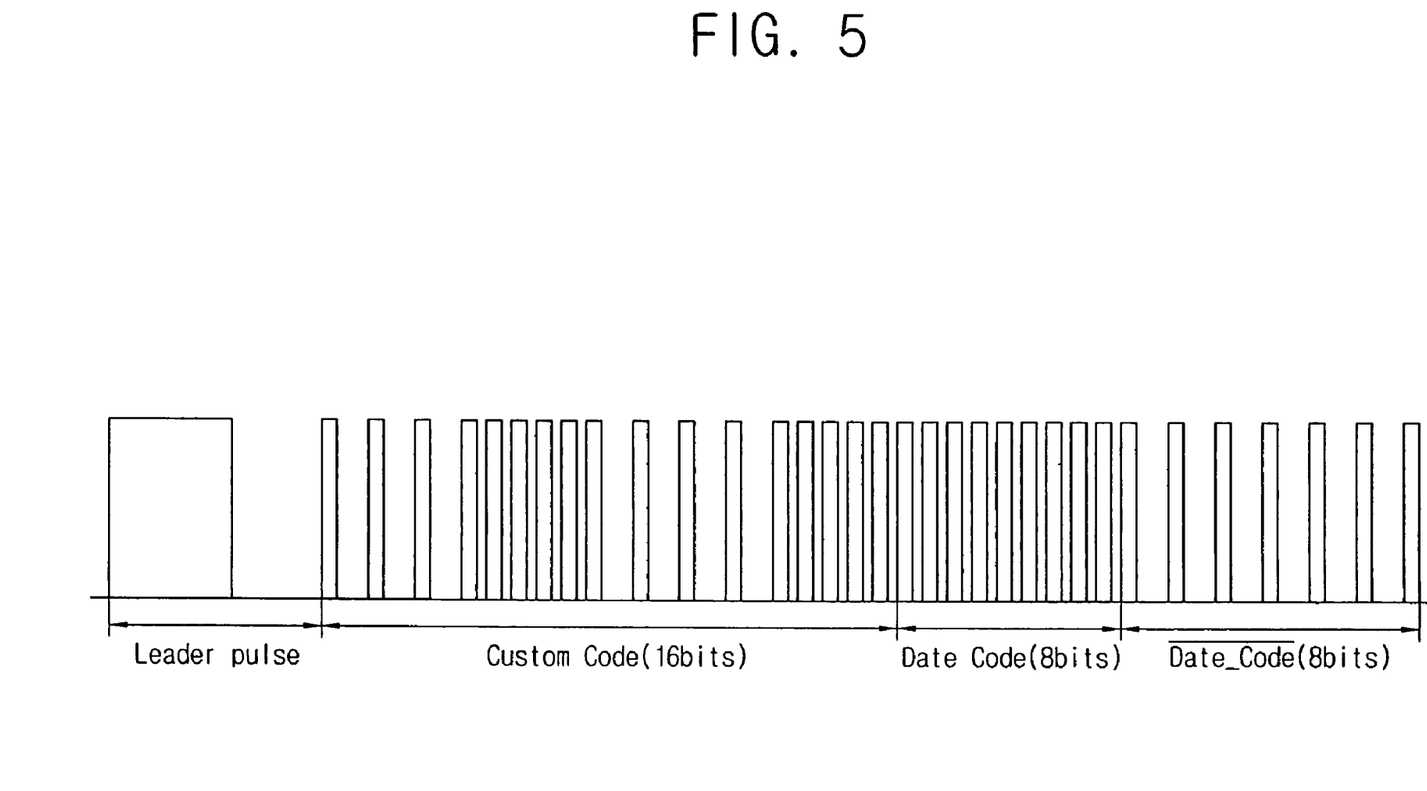
FIG. 5 shows a waveform of a signal from a general remote controller.

Prior to describing the operation of the SMI handler shown in FIG. 4, the waveform of the remote control signal will be described with reference to FIG. 5. The remote control signal includes a leader pulse, a custom pulse of 16-bit, a first data code of 8-bit, and a second data code of 8-bit. The leader pulse is used as a starting point for analyzing the remote control signal and must be detected before analyzing the custom pulse and data codes. Thus, it is only possible to analyze the custom and date codes after the leader pulse is detected. According to an aspect of the invention, the remote control signal includes 32-bit data per frame.

Referring to FIG. 4, at operation 400, the SMI handler checks whether the leader pulse is inputted. When the leader pulse is inputted, at operation 402, the SMI handler determines "0" or "1" by checking a pulse width of the leader pulse and accumulates the custom and data codes. When 32-bit data has been accumulated, i.e., one frame data is accumulated at operation 404, the SMI handler checks whether the custom code is available at operation 406. When data conversion is completed and determined as an effective value, at operation 408, the data is transmitted to a device driver, a launcher program, an application program, etc. through a predetermined interface. For example, the predetermined interface may include a separate interface as well as a keyboard interface. In the case of the keyboard interface, the complete data is returned to the keyboard controller 26. Thus, the data is transmitted through the keyboard controller 26.

Further, when the system is in a power-off mode or a power management mode, the wakeup unit 30 transmits a wakeup signal to the south bridge 14 in response to the remote control signal received by the remote signal receiver 12, thereby waking up the system.

According to an aspect of the invention, the remote signal receiver is connected to a GPI port of the south bridge, such that the south bridge generates the SMI signal and the SMI handler of the BIOS processes the remote control signal. Thus, the remote control signal is able to be processed without an additional circuit, such as a microcomputer, a clock generator, etc. Further, the remote control signal can be processed without a separate device driver because the SMM processing the SMI handler is an independent module of the OS.

Further, the remote control signal is analyzed by the SMI handler, so that a separate control program is not needed according to a type of the microcomputer. Further, the remote control signal is processed by the SMI handler of the BIOS, so that there is not separately needed communication with the BIOS and it is easy to check the power state of the system.

According to the aspects of the invention described above, the information processing system can be easily updated by a BIOS update program.

As described above, the invention provides an information processing system and a method of controlling the same, in which a remote control signal is processed without a separate microcomputer for receiving the remote control signal to implement a corresponding operation, thereby reducing a production cost and simplifying a circuit design.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling an information processing system, comprising:

temporarily storing a system management interrupt handler in a system management memory when the information processing system is booted;

generating a system management interrupt signal according to a remote control signal;

processing the remote control signal via the system management interrupt handler while the information processing system is operating, converting the control signal into data, and transmitting the converted data through a predetermined interface;

transmitting the generated system management interrupt signal to a processor; and turning over control authority of the information processing system to the system management interrupt handler stored in the system management memory, wherein the system management memory is only accessible to a system management interrupt mode at which a system management interrupt signal is generated.

2. The method of controlling the information processing system as claimed in claim 1, further comprising:

wherein the booting is a power on self test-booting performed to determine a connection state of at least one peripheral unit, such that during the power on self test-booting, the system management memory is initialized to be accessible to the system management interrupt mode for processing the system management interrupt signal.

3. The method of controlling the information processing system as claimed in claim 2, further comprising:

analyzing a waveform of the remote control signal to determine whether a custom code for the control signal is available such that a corresponding operation of the information processing system is implemented.

4. The method of controlling the information processing system as claimed in claim 3, wherein the analyzing the waveform of the remote control signal comprises:

determining whether the waveform has a leader pulse;

accumulating custom code and data code for each data frame until all bits of data are accumulated for each frame in order to determine whether custom code is available for the control signal; and transmitting the completed frame data to at least one predetermined interface when it is determined that the custom code is available.

5. The method of controlling the information processing system as claimed in claim 1, further comprising:

transmitting a wakeup signal to wake-up the information processing system upon receiving the remote control signal when the information processing system is in a power-off mode or a power manage mode.

6. The method of controlling the information processing system as claimed in claim 1, wherein the information processing system is a computer system.

* * * * *